United States Patent
Knowles et al.

(10) Patent No.: US 10,030,645 B2
(45) Date of Patent: Jul. 24, 2018

(54) REMOTELY RECONFIGURABLE HIGH PRESSURE FLUID PASSIVE CONTROL SYSTEM FOR CONTROLLING BI-DIRECTIONAL PISTON PUMPS AS ACTIVE SOURCES OF HIGH PRESSURE FLUID, AS INACTIVE RIGID STRUCTURAL MEMBERS OR AS ISOLATED FREE MOTION DEVICES

(71) Applicant: Murtech, Inc., Glen Burnie, MD (US)

(72) Inventors: Kenneth A. Knowles, Crofton, MD (US); Robert C. Murtha, Stevensville, MD (US); Christina Speight, Baltimore, MD (US)

(73) Assignee: Murtech, Inc., Glen Burnie, MD (US)

( * ) Notice: Subject to any disclaimer, the term of this patent is extended or adjusted under 35 U.S.C. 154(b) by 0 days.

(21) Appl. No.: 15/804,426

(22) Filed: Nov. 6, 2017

(65) Prior Publication Data
US 2018/0058440 A1   Mar. 1, 2018

Related U.S. Application Data

(60) Continuation of application No. 15/412,726, filed on Jan. 23, 2017, now Pat. No. 9,845,800, which is a
(Continued)

(51) Int. Cl.
*F04B 49/00* (2006.01)
*C02F 1/44* (2006.01)
(Continued)

(52) U.S. Cl.
CPC ............ *F04B 49/007* (2013.01); *C02F 1/441* (2013.01); *F03B 13/20* (2013.01); *F04B 5/02* (2013.01);
(Continued)

(58) Field of Classification Search
CPC ...... F04B 49/03; F04B 49/007; F04B 49/225; Y02E 10/30; Y02E 10/38
See application file for complete search history.

(56) References Cited

U.S. PATENT DOCUMENTS

| D71,287 S | 11/1867 | Dennisson et al. |
|---|---|---|
| 260,016 A | 6/1882 | Franklin |

(Continued)

FOREIGN PATENT DOCUMENTS

| CA | 1193490 | 9/1985 |
|---|---|---|
| DE | 2248260 | 4/1974 |

(Continued)

OTHER PUBLICATIONS

Bernitsas, et al., "VIVACE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.

(Continued)

*Primary Examiner* — Patrick Hamo
(74) *Attorney, Agent, or Firm* — Caesar Rivise, PC

(57) ABSTRACT

A bi-directional pump system that can be configured for a plurality of operating modes. The bi-directional pump system includes a plurality of bi-directional pumps each having their own valving system that are connected to a common high pressure manifold, a low pressure manifold and a suction manifold. Via the respective valve systems, each pump can be configured into: (1) a single-acting pumping mode; (2) a double-acting pumping mode; (3) an inactive free motion mode; and (4) an inactive rigid mode. One exemplary application of the bi-directional pump system is on an articulated wave energy conversion system that consists of three floating barges: a front barge, a center barge and a rear barge where the front barge and center barge are hingedly connected as are the center barge and the rear (Continued)

barge. A first set of the bi-directional pumps span the first hinge connection and the second set of bi-directional pumps span the second hinge connection. The bi-directional pump system intakes sea water and, using wave energy, outputs a high pressure flow of sea water for water desalination and/or for driving electrical generators.

14 Claims, 13 Drawing Sheets

Related U.S. Application Data division of application No. 15/134,909, filed on Apr. 21, 2016, now Pat. No. 9,587,635, which is a continuation of application No. 14/329,131, filed on Jul. 11, 2014, now Pat. No. 9,334,860.

(51) Int. Cl.
| | |
|---|---|
| F04B 11/00 | (2006.01) |
| F15B 7/02 | (2006.01) |
| F04B 53/14 | (2006.01) |
| F04B 53/10 | (2006.01) |
| F04B 49/22 | (2006.01) |
| F04B 23/06 | (2006.01) |
| F04B 9/117 | (2006.01) |
| F04B 5/02 | (2006.01) |
| F03B 13/20 | (2006.01) |
| C02F 103/08 | (2006.01) |

(52) U.S. Cl.
CPC .......... *F04B 9/117* (2013.01); *F04B 11/0033* (2013.01); *F04B 23/06* (2013.01); *F04B 49/225* (2013.01); *F04B 53/10* (2013.01); *F04B 53/144* (2013.01); *F15B 7/02* (2013.01); *C02F 2103/08* (2013.01); *C02F 2201/009* (2013.01)

(56) References Cited

U.S. PATENT DOCUMENTS

| | | |
|---|---|---|
| 344,813 A | 7/1886 | Bull |
| 1,078,323 A | 11/1913 | Trull |
| 1,636,447 A | 7/1927 | Standish |
| 2,731,799 A | 1/1956 | Lange et al. |
| 3,022,632 A | 2/1962 | Parks |
| 3,099,998 A | 8/1963 | Fisher |
| 3,120,491 A | 2/1964 | Kincaid |
| 3,191,202 A | 6/1965 | Handler |
| 3,376,588 A | 4/1968 | Berteaux |
| 3,628,334 A | 12/1971 | Coleman |
| 3,755,836 A | 9/1973 | Milazzo |
| 3,818,523 A | 6/1974 | Stillman, Jr. |
| 3,846,990 A | 11/1974 | Bowley |
| 3,848,419 A | 11/1974 | Bowley |
| 4,004,308 A | 1/1977 | Gongwer |
| 4,048,802 A | 9/1977 | Bowley |
| 4,077,213 A | 3/1978 | Hagen |
| 4,098,084 A | 7/1978 | Cockerell |
| 4,118,932 A | 10/1978 | Sivill |
| 4,209,283 A | 6/1980 | Marbury |
| 4,210,821 A | 7/1980 | Cockerell |
| 4,255,066 A | 3/1981 | Mehlum |
| 4,264,233 A | 4/1981 | McCambridge |
| 4,280,238 A | 7/1981 | van Heijst |
| 4,326,840 A | 4/1982 | Hicks et al. |
| 4,335,576 A | 6/1982 | Hopfe |
| RE31,111 E | 12/1982 | Hagen |
| 4,408,454 A | 10/1983 | Hagen et al. |
| 4,421,461 A | 12/1983 | Hicks et al. |
| 4,512,886 A | 4/1985 | Hicks et al. |
| 4,686,377 A | 8/1987 | Gargos |
| 4,698,969 A | 10/1987 | Raichlen et al. |
| 4,781,023 A | 11/1988 | Gordon |
| 4,786,239 A | 11/1988 | Eberhardt |
| 4,894,873 A | 1/1990 | Kiefer et al. |
| 4,954,110 A | 9/1990 | Warnan |
| 5,013,219 A | 5/1991 | Hicks et al. |
| 5,112,483 A | 5/1992 | Cluff |
| 5,132,550 A | 7/1992 | McCabe |
| 5,186,822 A | 2/1993 | Tzong et al. |
| 5,359,229 A | 10/1994 | Youngblood |
| 5,558,459 A | 9/1996 | Odenbach et al. |
| 5,584,673 A | 12/1996 | Rein |
| 5,600,961 A | 2/1997 | Whipple, III |
| 5,879,105 A | 3/1999 | Bishop et al. |
| 6,406,221 B1 | 6/2002 | Collier |
| 6,451,204 B1 | 9/2002 | Anderson |
| 6,476,511 B1 | 11/2002 | Yemm et al. |
| 6,647,716 B2 | 11/2003 | Boyd |
| 6,863,806 B2 | 3/2005 | Stark et al. |
| 7,023,104 B2 | 4/2006 | Kobashikawa |
| 7,042,112 B2 | 5/2006 | Wood |
| 7,245,041 B1 | 7/2007 | Olson |
| 7,264,420 B2 | 9/2007 | Chang |
| 7,443,047 B2 | 10/2008 | Ottersen |
| 7,579,704 B2 | 8/2009 | Steenstrup et al. |
| 7,658,843 B2 | 2/2010 | Krock et al. |
| 7,694,513 B2 | 4/2010 | Steenstrup et al. |
| 7,728,453 B2 | 6/2010 | Evans |
| 7,900,571 B2 | 3/2011 | Jaber et al. |
| 8,564,150 B2 | 10/2013 | Shpinev |
| 8,564,151 B1 | 10/2013 | Huebner |
| 8,650,869 B1 | 2/2014 | McCormick |
| 2003/0010691 A1 | 1/2003 | Broussard |
| 2003/0121408 A1 | 7/2003 | Linerode et al. |
| 2006/0112871 A1 | 6/2006 | Dyhrberg |
| 2006/0283802 A1 | 12/2006 | Gordon |
| 2007/0108112 A1 | 5/2007 | Jones et al. |
| 2007/0130929 A1 | 6/2007 | Khan et al. |
| 2007/0200353 A1 | 8/2007 | Ottersen |
| 2007/0286745 A1 | 12/2007 | Chance |
| 2009/0084296 A1 | 4/2009 | McCormick |
| 2010/0054961 A1 | 3/2010 | Palecek et al. |
| 2010/0320759 A1 | 12/2010 | Lightfoot et al. |
| 2011/0299927 A1 | 12/2011 | McCormick et al. |
| 2012/0025532 A1 | 2/2012 | Song |
| 2012/0067820 A1 | 3/2012 | Henthorne et al. |
| 2013/0008158 A1 | 1/2013 | Hon |
| 2013/0008164 A1 | 1/2013 | Cunningham et al. |
| 2014/0008306 A1 | 1/2014 | Murtha et al. |
| 2014/0091575 A1 | 4/2014 | McCormick et al. |
| 2014/0158624 A1 | 6/2014 | Murtha et al. |
| 2014/0366717 A1 | 12/2014 | Tsukane |

FOREIGN PATENT DOCUMENTS

| | | |
|---|---|---|
| FR | 2437507 | 4/1980 |
| GB | 2113311 | 8/1983 |
| GB | 2459112 | 10/2009 |
| JP | 2002142498 | 5/2002 |
| KR | 20080059158 | 6/2008 |
| KR | 20110020077 | 3/2011 |
| WO | WO 88/01021 | 2/1988 |
| WO | WO 95/10706 | 4/1995 |
| WO | WO 01/96738 | 12/2001 |
| WO | WO 03/026954 | 4/2003 |
| WO | WO 2013/140879 | 9/2013 |

OTHER PUBLICATIONS

Blevins, Robert D., "Flow-Induced Vibrations," Van Nostrand Reinhold, New York, 1990, pp. 194-213.
Budar, et al., "A Resonant Point Absorber of Ocean-Wave Power," Nature, vol. 256, Aug. 1975, pp. 478-480.
Cébron, et al., "Vortex-Induced Vibrations Using Wake Oscillator Model Comparison on 2D Response with Experiments," Institute of Thermomechanics, Prague, 2008.
Falnes, Johannes, "Ocean Waves Oscillating Systems," Cambridge University Press, pp. 196-224, 2002.

(56) References Cited

OTHER PUBLICATIONS

Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.

Gamaud, et al, "Comparison of Wave Power Extraction by a Compact Array of Small Buoys and by a Large Buoy," Proceedings of the 8th European Wave and Tidal Energy Conference, Uppsala, Sweden, 2009, pp. 934-942.

Jauvitis, et al., The Effect of Two Degrees of Freedom on Vortex-Induced Vibration at Low Mass and Damping,: J. Fluid Mechanics, vol. 509, 2004, pp. 23-62.

Lee, et al., "On the Floating Breakwater—A New Arrangement," Proceedings, International Conf. on Coastal Engineering, Taipei, 1986, pp. 2017-2022.

Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.

Liang, et al., "A Study of Spar Buoy Floating Breakwater," Ocean Engineering, vol. 31, 2004, pp. 43-60.

McCormick, et al., "Full-Scale Experimental Study of Bi-Modal Buoy," Report EW 01-11, Department of Naval Architecture and Ocean Engineering, U.S. Naval Academy, Jun. 2011, 32 pages.

McCormick, et al., "Planing Characteristics of Fast-Water Buoys," Journal of the Waterways Harbors and Coastal and Engineering Division, vol. 99, No. WW4, Nov. 1973, pp. 485-493.

McCormick, et al., "Prototype Study of a Passive Wave-Energy Attenuating Bi-Modal Buoy," Murtech, Inc. Report M-12-1, Jan. 2012, 26 pages.

Miles, John W., "On the Interference Factors for Finned Bodies," J. Aeronautical Sciences, vol. 19, No. 4, Apr. 1952, p. 287.

Murali, et al., "Performance of Cage Floating Breakwater," Journal of Waterway, Port, Costal and Ocean Engineering, Jul./Aug. 1997, pp. 1-8.

Ng, et al., "An Examination of Wake Oscillator Models for Vortex-Induced Vibrations," Naval Undersea Warfare Center Division, Newport, RI, Technical Report 11,298, Aug. 1, 2011, 18 pages.

Ogink, et al., "A Wake Oscillator With Frequency Dependent Coupling for the Modeling of Vortex-Induced Vibration," Journal of Sound and Vibration, No. 329, 2010, pp. 5452-5473.

Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.

Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.

Shiguemoto, et al., "Vortex Induced Motions of Subsurface Buoy with a Vertical Riser: A Comparison Between Two Phenomenological Models" Proceedings, 23° C. Congresso Nacional de Transporte Aquaviário, Construção Naval e Offshore, Rio de Janeiro, Oct. 25-29, 2010, pp. 1-9.

Sobey, et al., "Hydrodynamic of Circular Piles," Proceedings, 6th Australian Hydraulics and Fluid Mechanics conference, Adelaide, Dec. 1977, pp. 253-256.

Long Beach Water Department, Under-Ocean Floor Seawater intake and Discharge Test Plan, Apr. 1, 2009.

Lovo, Robert, "Initial Evaluation of the Subfloor Water Intake Structure System (SWISS) vs. Conventional Multimedia Pretreatment Techniques," Assistance Agreement No. 98-FC-81/0044, Desalination Research and Development Program Report No. 66, U.S. Dept. of Interior, May 2001.

McCormick, "Ocean Wave Energy Conversion," Wiley-Interscience, New York (1981, reprinted by Dover Publication, Long Island, New York in 2007).

WateReuse Association, "Overview of Desalination Plan Intake Alternatives", Mar. 2011.

International Search Report for corresponding PCT Application No. PCT/US2013/059175 dated Mar. 19, 2014.

International Search Report for related PCT Application No. PCT/US2013/048906 dated Sep. 30, 2013.

International Search Report for related PCT Application No. PCT/US2015/039660 dated Dec. 15, 2015.

International Search Report for related PCT Application No. PCT/US2014/056243 dated Dec. 15, 2014.

REMOTELY RECONFIGURABLE HIGH PRESSURE FLUID PASSIVE CONTROL SYSTEM FOR CONTROLLING BI-DIRECTIONAL PISTON PUMPS AS ACTIVE SOURCES OF HIGH PRESSURE FLUID, AS INACTIVE RIGID STRUCTURAL MEMBERS OR AS ISOLATED FREE MOTION DEVICES

CROSS REFERENCE TO RELATED APPLICATIONS

This is a Continuation application which claims the benefit under 35 U.S.C. § 120 of application Ser. No. 15/412,726 filed on Jan. 23, 2017 which in turn is a Divisional application that claims the benefit under 35 U.S.C. § 121 of application Ser. No. 15/134,909 filed on Apr. 21, 2016 (now U.S. Pat. No. 9,587,635) which in turn is a Continuation application which claims the benefit under 35 U.S.C. § 120 of application Ser. No. 14/329,131 filed on Jul. 11, 2014 (now U.S. Pat. No. 9,334,860), all of which are entitled REMOTELY RECONFIGURABLE HIGH PRESSURE FLUID PASSIVE CONTROL SYSTEM FOR CONTROLLING BI-DIRECTIONAL PISTON PUMPS AS ACTIVE SOURCES OF HIGH PRESSURE FLUID, AS INACTIVE RIGID STRUCTURAL MEMBERS OR AS ISOLATED FREE MOTION DEVICES, and all of whose entire disclosures are incorporated by reference herein.

BACKGROUND OF THE INVENTION

The present invention relates in general to high pressure pump systems and, more particularly, to a remotely-configurable high pressure fluid passive control system for controlling bi-directional pumps.

Richard Peter McCabe devised the McCabe Wave Pump, which is described in U.S. Pat. No. 5,132,550. The McCabe Wave Pump consists of three rectangular steel pontoons, which move relative to each other in the waves. A damper wave plate attached to the central pontoon ensures that it remains stationary as the fore and aft pontoons move relative to the central pontoon by pitching about the hinges. Energy is extracted from the rotation about the hinge points by linear hydraulic pumps mounted between the central and other two pontoons near the hinges.

A related configuration to the McCabe Wave Pump is an "articulated wave energy conversion system (AWECS)" which is disclosed in U.S. Patent Publication Nos. 2014/0008306 (Murtha, et al.); 2014/0158624 (Murtha, et al.); and U.S. Patent Publication No. 2014/0091575 (McCormick, et al.), and all of which are owned by the same Assignee as the present application, namely, Murtec, Inc. of Glen Burnie, Md. See also U.S. Pat. No. 8,650,869 (McCormick). As shown in FIG. 1, an AWECS uses a plurality of pneumatic or hydraulic pumps P (hereinafter, "hydraulic" is used, it being understood that "pneumatic" is also interchangeable with "hydraulic") that straddle the two articulating barges, a forward barge FB and a rear barge RB which are coupled together, e.g. by hinges. A damper wave plate (DWP) attached to a central barge CB ensures that it remains stationary as the fore FB and aft RB barges move relative to the central barge CB by pitching about the hinges. As an incoming wave makes contact with the forward barge FB first, the hydraulic fluid in the pumps coupled between the forward barge FB and the center barge CB are driven in a first direction; as the wave continues, the hydraulic fluid in the pumps P coupled between the rear barge RB and the center barge CB are driven in a second opposite direction. The end results are bi-directional hydraulic pumps P. The output of these hydraulic pumps P are used for water desalination or energy conversion.

Doug Hicks and Charles M. Pleass devised the Delbuoy wave-powered desalination unit, described in U.S. Pat. Nos. 5,013,219; 4,512,886; 4,421,461, and 4,326,840. When the waves lift and then lower the Delbuoy wave-powered desalination unit, a piston connected to the bottom of the buoy drives a piston pump at the sea floor. The pressure created by the pump is strong enough to drive the sea water through a reverse osmosis filter, which removes salt and impurities from the water, and then to send the fresh water through a pipe to the shoreline, where it is tapped and used by people.

However, there remains a need for quickly and easily reconfiguring the operational modes of pumps depending on different scenarios which none of the aforementioned disclosures teach or suggest.

All references cited herein are incorporated herein by reference in their entireties.

BRIEF SUMMARY OF THE INVENTION

A bi-directional pump system for providing a high pressure fluid output is disclosed. The pump system comprises: at least one bi-directional pump having a piston and piston rod that can translate within a cylinder in two opposite directions, wherein the piston separates the cylinder into two variable-sized chambers, and wherein the piston displaces fluid located in each chamber when the piston is in motion due to external forces acting through the piston rod and the cylinder; each variable chamber being in fluid communication through a valve network to a high pressure manifold, a low pressure manifold and a suction manifold, wherein the high pressure manifold has an output for delivering the high pressure fluid to a target process and wherein the suction manifold provides a fluid input into the bi-directional pump system; and wherein the valve network can be configured to deliver high pressure fluid from one of a single-acting pumping mode and a double-acting pumping mode, wherein the single-acting pumping mode delivers high pressure fluid to the target process during piston motion in one of the two opposite directions and wherein the double-acting pumping mode delivers high pressure fluid to the target process during piston motion in both of the two opposite directions.

A method for permitting a plurality of parallel-acting bi-directional pumps to be configured into a plurality of operational modes is disclosed. The method comprises: providing a plurality of bi-directional pumps, each bi-directional pump having a piston and piston rod that can translate within a cylinder in two opposite directions, wherein each piston separates the corresponding cylinder into two variable-sized chambers, wherein the piston displaces fluid located in each chamber when the piston is in motion due to external forces acting through each piston rod and each cylinder; coupling each variable-sized chamber, through a respective valve network, to a high pressure manifold, a low pressure manifold and a suction manifold, wherein the high pressure manifold has an output for delivering the high pressure fluid to a target process and wherein the suction manifold provides a fluid input into the bi-directional pump system; and controlling the valve network so that each one of the plurality of bi-directional pumps can be configured to deliver high pressure fluid from one of a single-acting pumping mode and a double-acting pumping mode, wherein the single-acting pumping mode delivers high pressure fluid to the target process during piston motion in one of the two opposite directions and wherein the double-acting pumping mode delivers high pressure fluid to the target process during piston motion in both of the two opposite directions.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
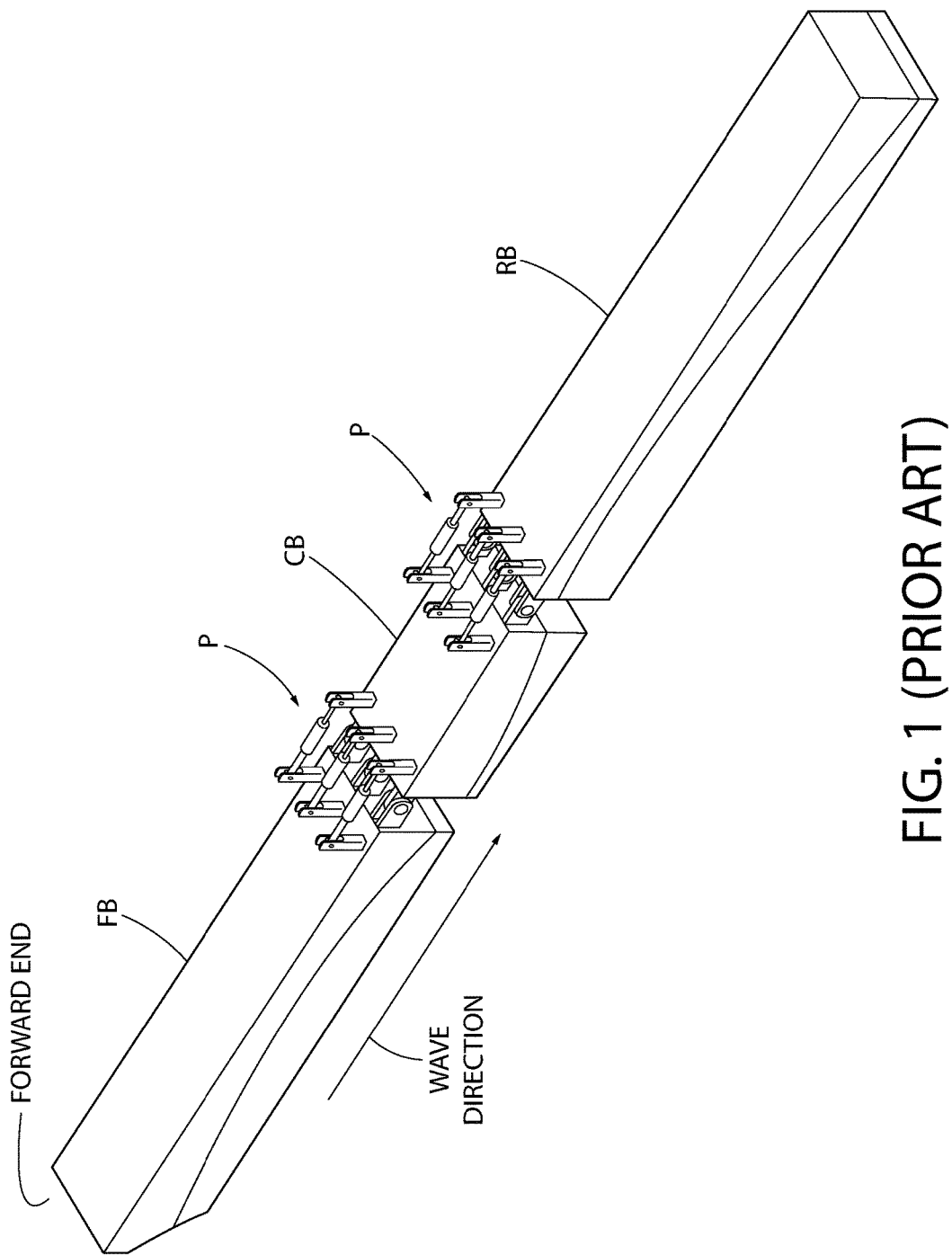
FIG. 1 is an isometric view of a prior art articulate barge wave-energy converter system (AWECS)

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The present invention 20 relates in general to an apparatus comprising a liquid pipe and valve system or network designed to be configured locally or remotely and passively control the operation of bi-directional piston pumps in any of four modes:

(1) Single-Acting Pumping Mode (SAPM): a single-ended piston source of high pressure fluid only from rod end piston fluid connection as piston rod is being extended;

(2) Double-Acting Pumping Mode (DAPM): a single-ended piston source of high pressure fluid from both piston fluid connections as piston rod is being extended and retracted;

(3) Inactive Free Motion Mode (IFMM): an isolated cylinder with both piston fluid connections isolated but with them connected to each other to permit free movement of the piston with minimum force for isolating the cylinder from the system while the remainder of a bank of multi-mode pumps continue to pump pressurized fluid; and (4) Inactive Rigid Mode (IRM): an isolated cylinder with both piston fluid connections isolated to create a hydraulic lock on the piston to provide a rigid structural member between the two sources of force on the piston rod and housing.

Figure 2:
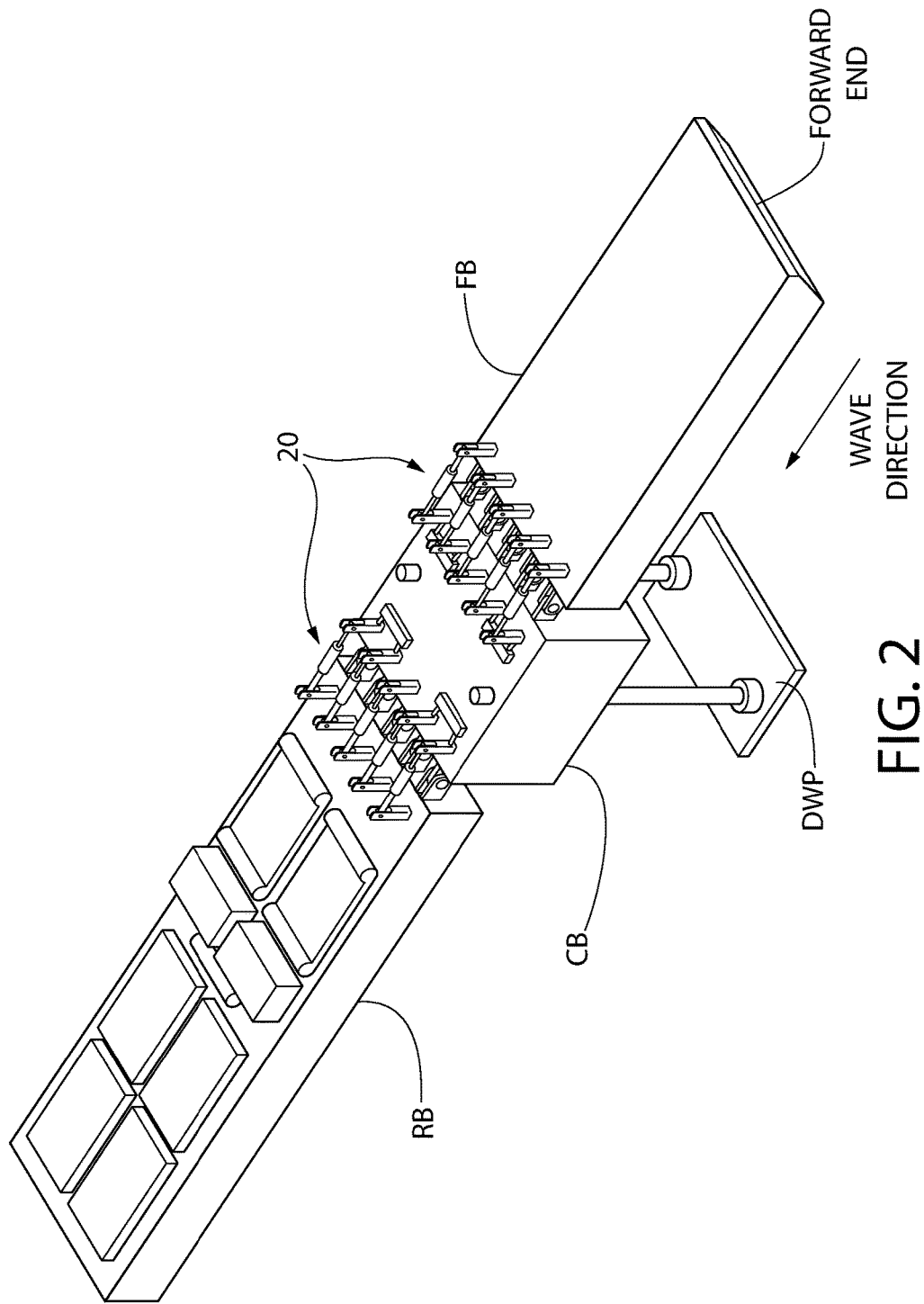
FIG. 2 shows the invention of the present application integrated on an AWECS.

As a result, the apparatus 20 has an unlimited number of uses (hence the term "target process" used in several of the figures) high pressure fluid is required and the need to use these four modes operation are available. Thus, by way of example only and not by way of limitation, as shown in FIG. 2, this apparatus 20 is depicted being implemented on an articulated wave energy conversion system (AWECS) 10 for implementing water desalination and/or ocean energy wave conversion. Specifically, it relates to the exploitation of ocean wave energy in the production of potable water by reverse osmosis desalination, or the generation of electricity by driving an electrical generator. Ocean energy comes in a variety of forms including tidal currents, ocean currents, and surface waves. Wave power is the transport of energy by surface waves, and the capture of that energy to do useful work. Thus, the following description shows the implementation of the apparatus 20 in an AWECS environment simply by way of example.

Figure 3:
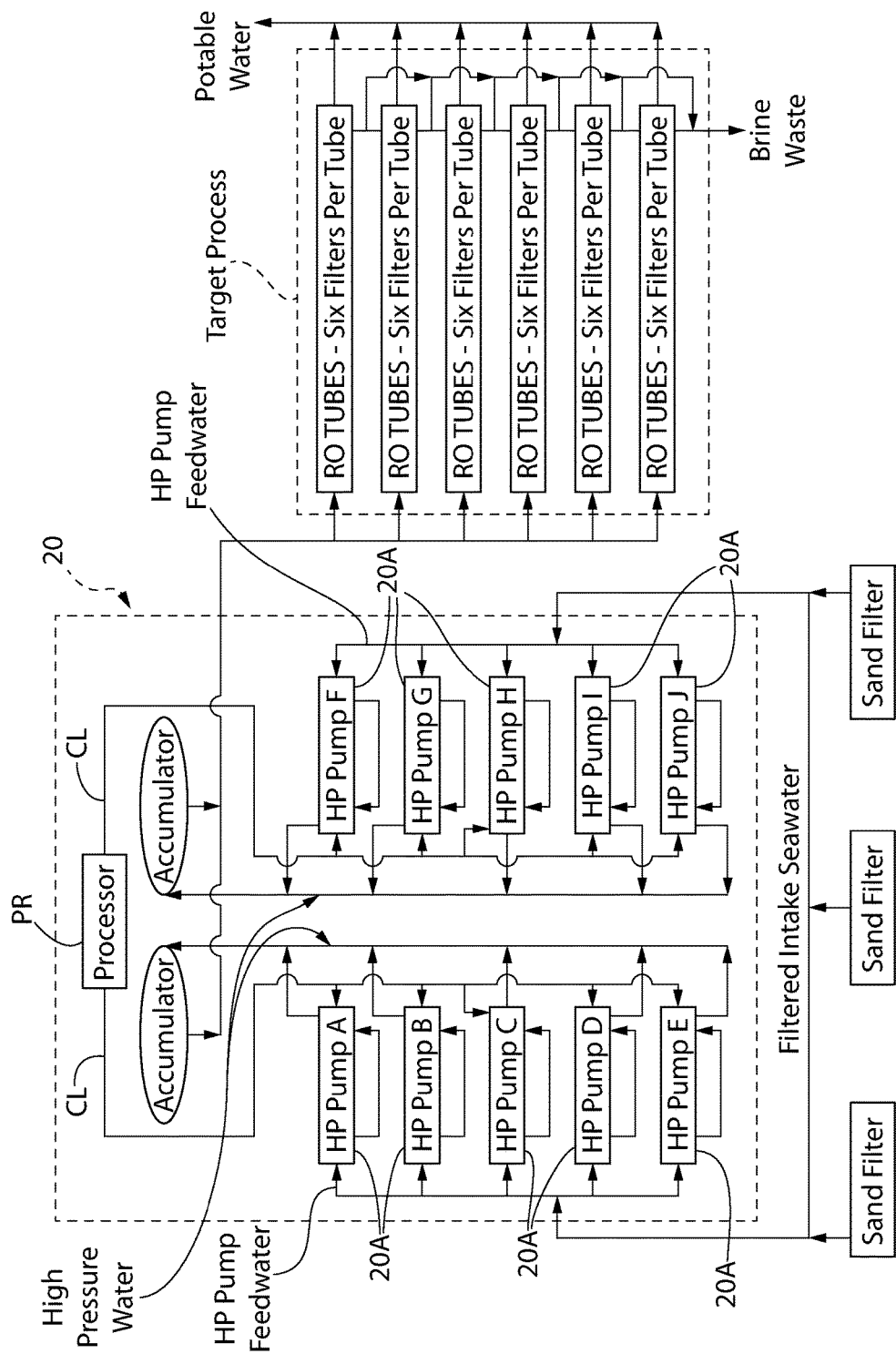
FIG. 3 is a block diagram of the invention, shown for the Single-Acting Pumping Mode (SAPM), by way of example only, and wherein an exemplary target process is a reverse osmosis (RO) water desalination stage.

FIG. 3 shows an overview of the system 20 implemented for water desalination (by way of example only) and during a particular mode, namely, SAPM, for clarity only. As shown, the target process utilizes a plurality of reverse osmosis (RO) tubes for desalinating the high pressure water; the output of these tubes results in a potable water flow, as well as a brine waste flow. As can be seen, a first set of high pressure (HP) pumps (e.g., five pumps A-E, indicated as "A-E") are those that straddle the FB/CB barges while the second set of HP pumps (e.g., another five pumps "F-J") are those that straddle the CB/RB barges. Each pump A-J are identical and any one of them will be referred to herein as "pump 20A." Each of the HP pumps valve systems, as discussed in detail below, may be automatically controlled by a processor PR that can be located remotely or locally with respect to the pumps 20A. Moreover, the communication link CL between the processor and valve system may be either a wired or wireless interface. Alternatively, each valve in the valve system for each pump may be manually controlled by service personnel, if desired.

The terms "high pressure (HP)" and "low pressure (LP)" as used throughout this Specification may comprise approximately 1000 psi and 100 psi, respectively.

Figure 4:
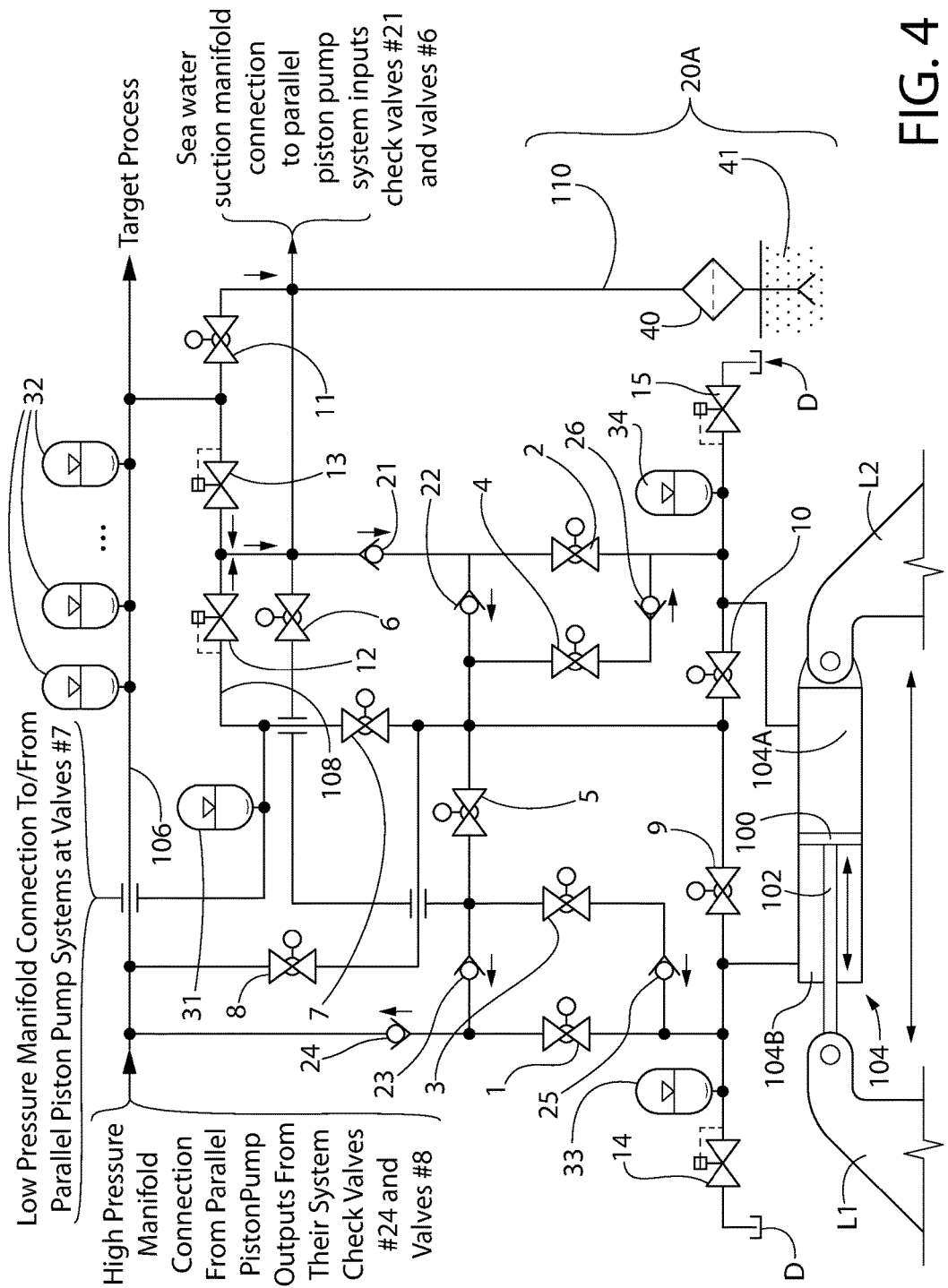
FIG. 4 depicts one of the high pressure pumps of the present invention and its associated valve system for implementing the four modes of pump control while also showing the high pressure manifold, low pressure manifold and suction manifold shared by all of the pumps.

FIG. 4 depicts a single HP pump 20A (e.g., a single-ended piston pump) and how it is coupled in fluid communication with the other HP pumps in the system 20. As can be seen, each pump 20A comprises a single rod end double-acting cylinder. In particular, a piston head 100 driven by a piston rod 102 is moved back and forth within the cylinder 104 which has a non-rod end 104A and a rod end 104B. These two cylinder chambers 104A/104B are in fluid communication with a high pressure (HP) manifold 106, a low pressure (LP) manifold 108 and a suction manifold 110 through a network of valves, generally referred to as the HP pump's "valve system." The valve system includes fluid pipes and fittings, remotely positioned 2-way full-port ball valves that can be actuated locally or remotely (as discussed previously with regard to FIG. 3), check valves, hydraulic accumulators, pressure control/relief valves, and a separately controlled back flush valve.

As mentioned previously, the piston 100 within the cylinder 104 is moved back and forth within the cylinder 104 by the motion of alternately extending and retracting the connected piston rod 102 relative to the cylinder 104 by an external force provided by, e.g., wave power, by way of example only in the present application. This reciprocating action of the piston/rod causes fluid to be drawn into the expanding cavity end of the cylinder 104, and expelled from the shrinking cavity end. For the present exemplary intended use as a high pressure sea water pumping system, the inlet to the suction manifold 110 is filtered by a sand filter 40 on the sea bed 41 followed by a fine strainer (not shown) to remove particulate matter that could cause excessive wear on the piston pumps. Also, the low pressure and high pressure manifolds 106/108 relieve excess pressure by porting fluid back to the suction manifold 110 to provide a back flush action of the suction strainer, as does a separate back flush valve 11 when opened momentarily.

As shown in FIG. 4, one end of the piston rod 102 is rotatably coupled to a first lever L1 while the non-rod end 104A of the cylinder 104 is rotatably coupled to a second lever L2. These levers L1/L2 are alternately moved together and then away from each other by an external mechanical force (e.g., wave motion). This force causes the cylinder piston rod 102 to alternately extend and contract, thus drawing fluid into one piston cavity (either 104A or 104B) and expelling fluid out of the other piston cavity (either 104B or 104A). By way of example only, the fluid connections of this cylinder 104 are connected to the instant invention configuration and control system schematic to provide continuously flowing high pressure sea water to a target process requiring such a continuous supply. For alternate use with a closed system hydraulic oil power generation system, the suction of the cylinder 104 would be from a sump (not shown), as opposed to a sand filter 40 in the sea bed 41; the high pressure discharge would go to a hydraulic oil process, as opposed to a seawater process; the hydraulic process would discharge oil back to the sump, as opposed to discharging salt water back to sea as with a sea water process; and the two pressure control/relief valves 12, 13, would drain the hydraulic oil back to the sump, as opposed to draining sea water to the suction manifold for back flushing the suction strainer as with the sea water process.

An apparatus for pumping sea water drawn from the sea to a process requiring a continuous direct flow of high pressure sea water uses a reciprocating pump powered by external mechanical forces. A power take-off sub-system is a shaft that transfers mechanical power between mechanical systems. In another embodiment of the instant invention, power take-off is the transformation of power to fluid power. An embodiment of the instant invention includes at least two power take-off sub-systems. e.g., a first power take-off sub-system and a second power take-off sub-system. The first power take-off sub-system from the articulated levers is, for example, a single rod end double-acting hydraulic cylinder pump. By itself, the double-acting hydraulic pump produces alternating fluid flow in and out of the fluid connections at each end of the cylinder.

Figure 9A:
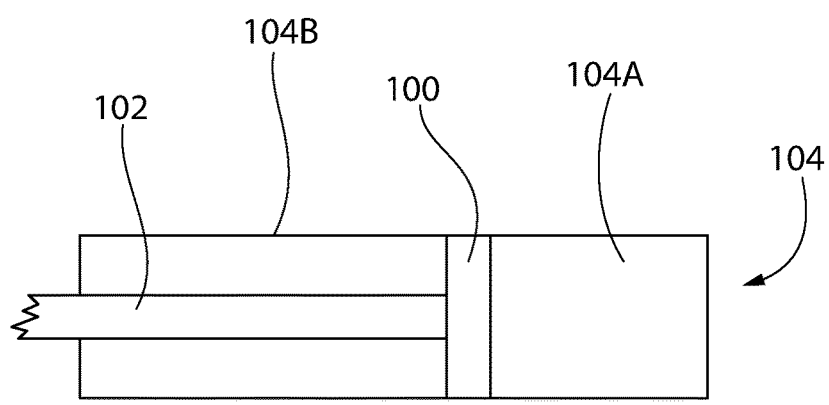
FIG. 9A is a functional diagram of the piston, piston rod and cylinder of one of the pumps.
Figures 9B, 9C:
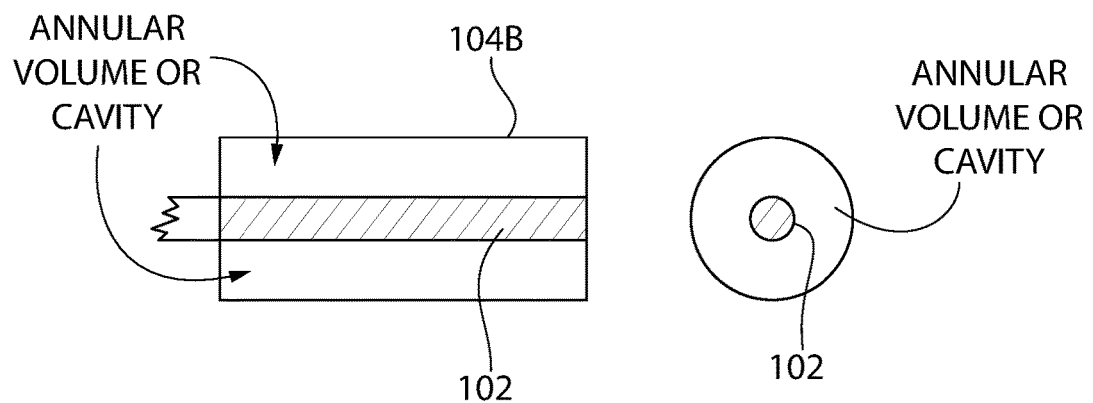
FIGS. 9B-9C depict the annular volume of the rod-end of cylinder due to the presence of the piston rod.

It should be noted that the useable volume in the rod end of the cylinder 104B actually forms an annular volume due to the presence of the rod 102. This can be most easily seen in FIGS. 9A-9C. Since the annular volume per unit length of piston 100 travel at the rod end of the cylinder 104B is less by the volume of the entrained piston rod 102 than the volume per unit length of piston travel at the non-rod end of the cylinder 104A, there will be an excess of fluid expelled from the non-rod end of the cylinder 104A equal to the volume of the entrained piston rod 102.

Four Fluid Functionalities

The fluid flow control system of the present invention 20 can be configured to provide four different fluid functionalities as described in the following paragraphs. These configurations are realized through appropriate positioning either locally or remotely using remote actuators (not shown) to OPEN or SHUT the 2-way full-port (e.g., very low flow resistance) ball valves 1, 2, 3, 4, 5, 6, 7, 8, 9, 10 as shown in FIG. 4. Once these ball valves are positioned, they remain in that position indefinitely without further actuation required. Check valves 21, 22, 23, 24, 25, 26 permit flow only in the direction shown by each valve, and only when there is a positive pressure differential sufficient to cause that flow. Reverse flow is prohibited through these valves regardless of the pressure differential across them. Fluid hydraulic accumulator 31 stores excess fluid and maintains the low pressure manifold 108 fluid pressure. Accumulator group 32 store excess fluid and maintain the high pressure manifold 106 fluid pressure. Pressure relief valve 12 restricts the low pressure manifold 108 pressure to a specified maximum value by relieving fluid back to the suction manifold 110 when the maximum specified value is reached for the open loop water system (and back to the sump for a closed loop hydraulic oil system). Pressure relief valve 13 restricts the high pressure manifold 106 pressure to a specified maximum value by relieving fluid back to the suction manifold 110 until the pressure is reduced sufficiently when the maximum specified value is reached for the open loop water system (or back to the sump for a closed loop hydraulic oil system). For the open water system, the relief water flow back to the suction manifold 110 provides beneficial periodic back flushing of the suction strainer 40. For additional suction strainer back flushing in all system configurations NORMALLY SHUT valve 11 is placed OPEN momentarily to provide flushing water from the high pressure manifold.

It should be noted that in FIGS. 5A-8B the "X" used in the diagrams indicates a "closed valve" while an "O" used in the diagrams indicates an "open valve."

Figure 5A:
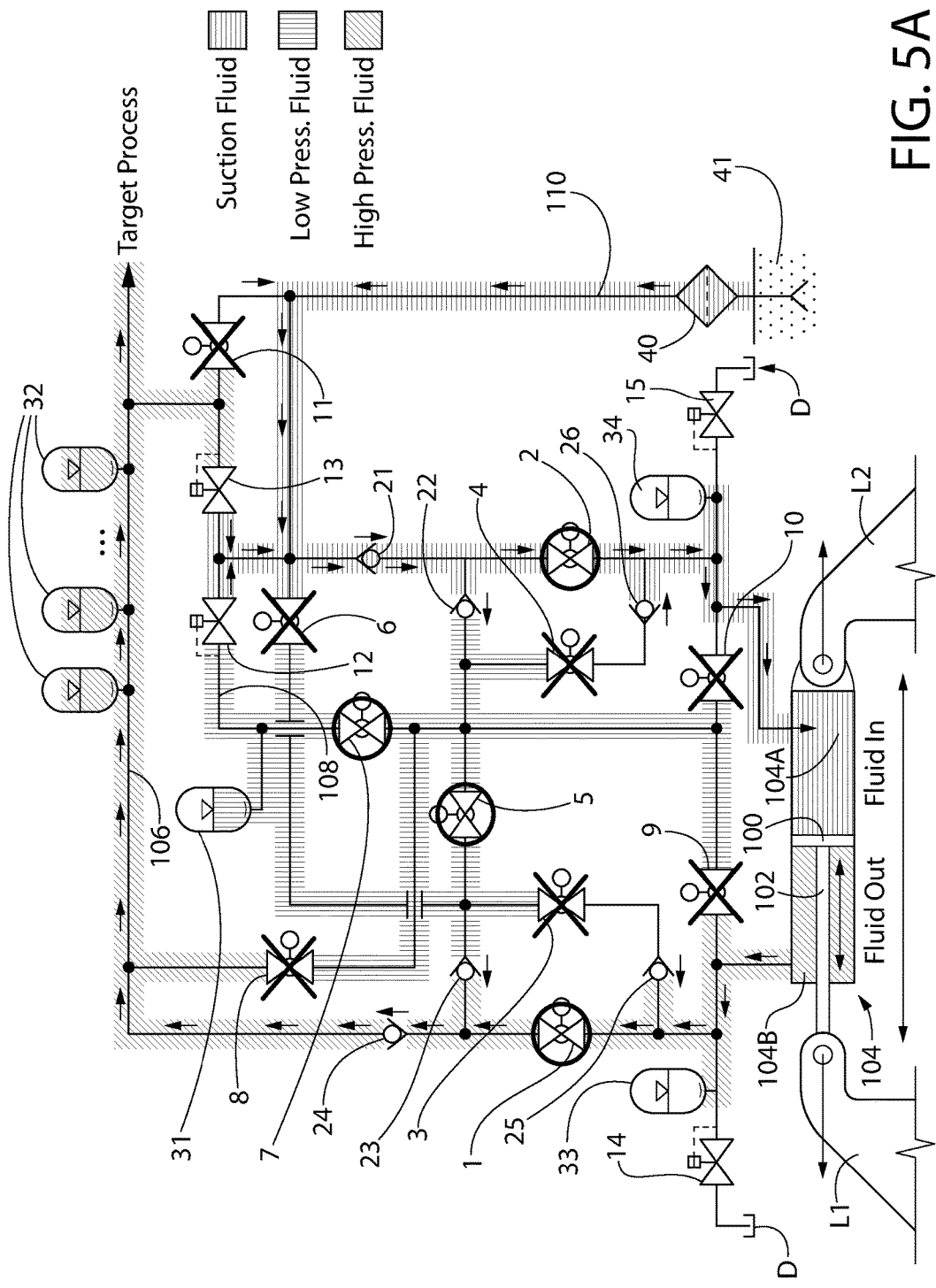
FIG. 5A depicts the particular valve states for implementing the Single-Acting Pumping Mode (SAPM) during the piston rod extension half-cycle in one of the pumps.
Figure 5B:
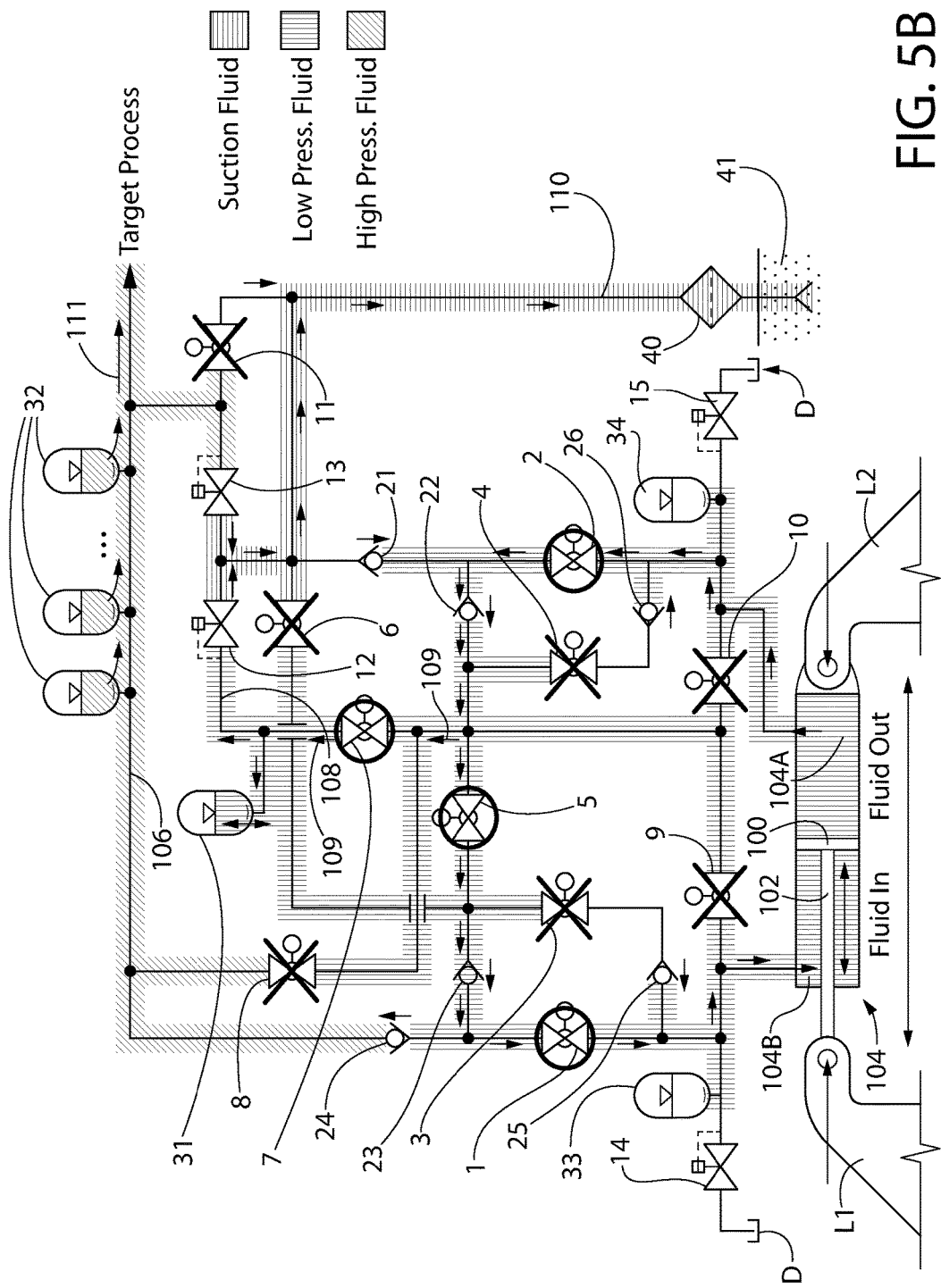
FIG. 5B depicts the particular valve states for implementing the SAPM during the piston rod retraction half-cycle in the pump of FIG. 5A.

Single-Acting Pumping Mode (SAPM): FIGS. 5A-5B

An embodiment of the instant invention of a reconfigurable fluid control and distribution system is, for example, a configuration to provide single-acting pump delivery of high pressure sea water for delivery direct flow to a reverse osmosis system for conversion to potable water. In this configuration, ball valves 1, 2, 5, 7 are placed in the OPEN position, while ball valves 3, 4, 6, 8, 9, 10, 11 are placed in the SHUT position. Relief valves 12, 13 remain SHUT except for overpressure conditions where they relieve their respective manifold fluid back to the suction manifold until the overpressure condition is corrected.

During the portion of the cycle where the external mechanical forces cause the two hinged levers to move apart and the piston rod 102 is extended (FIG. 5A), fluid that had been within the annular cavity 104B at the rod end of the cylinder is expelled from that end of the cylinder at sufficient pressure to force the fluid through OPEN ball valve 1 and through check valve 24 into the high pressure manifold. Check valves 23, 25 and SHUT valves 8, 9, 11 restrict the pumped high pressure fluid to this path. During this same portion of the cycle, filtered and strained fluid is drawn into the cavity at the non-rod end of the cylinder 104A from the suction manifold 110 through check valve 21 and OPEN ball valve 2. Check valve 22 and SHUT valves 4, 6, 10, 11 restrict the suction fluid to this path. During this high pressure pumping portion of the cycle the forces on the piston rod 102 are the greatest. By pumping from the rod end of the cylinder 104B, the greatest stress on the rod 102 exists while it is in tension, thus the likelihood of rod 102 bending and rod seal wear is minimized. As shown in FIG. 5A, full flow from the rod-end 104B is delivered to the HP manifold 106, wherein one half of that full flow is delivered to the accumulators 32 and the other one half of the full flow is delivered to the target process. It should be noted that during this extension half-cycle, there is no flow low pressure (LP) fluid movement in the LP manifold 108. The spring accumulators 33/34 also remain empty during this half-cycle.

During the portion of the cycle where the external mechanical forces cause the two hinged levers to move toward each other (FIG. 5B) and the piston rod 102 to be pushed into the cylinder 104, fluid that was in the cavity 104B at the non-rod end of the cylinder is expelled from that end of the cylinder 104 at sufficient pressure to flow into the low pressure manifold 108 and into the cavity at the rod end of the cylinder 104B through OPEN ball valves 2, 7, 5, 1 and check valves 22, 23. Check valves 26, 21, 25, 24 (due to the higher pressure of the high pressure manifold preventing a positive pressure differential across this last check valve) and SHUT valves 3, 4, 6, 8 restrict the fluid transfer from non-rod end 104A to rod-end of the cylinder 104B to this path. Relief valves 12, 13 remain SHUT except for overpressure conditions where they relieve their respective manifold fluids back to the suction manifold until the overpressure condition is corrected. Thus, as shown in FIG. 5B, there is no flow from the pump through the HP manifold 106 and only the one-half flow 111 is provided to the target process from the accumulators 32 that was stored in those accumulators 32 in the previous extension one-half cycle (FIG. 5A). The spring accumulators 33/34 also remain empty during this half-cycle also.

As mentioned earlier, due to the annular volume of the rod-end chamber 104B, there is an excess fluid (see excess fluid flow 109, in FIGS. 5B and 7A-7B) that is expelled from the non-rod chamber 104A. This excess fluid flows into the low pressure manifold 108. This repeated addition of fluid causes the pressure in the low pressure manifold 108 and accumulator 31 to gradually increase until the maximum desired is reached. At this point, pressure relief valve 12 relieves fluid back to the suction manifold 110 until the pressure is sufficiently reduced, and it ceases relieving. This periodic relief from the low pressure relief valve 12 provides the benefit of an automatic periodic back flush for the suction screen 40.

Since the non-rod end of the cylinder 104B, which takes suction directly from the sea, acts as a prime pump for the high pressure pumping rod end in this configuration, the cylinder 104 tends to supply fluid to the high pressure pump side with potentially less suction induced gas content than if that side were to take direct sea suction.

Figure 6A:
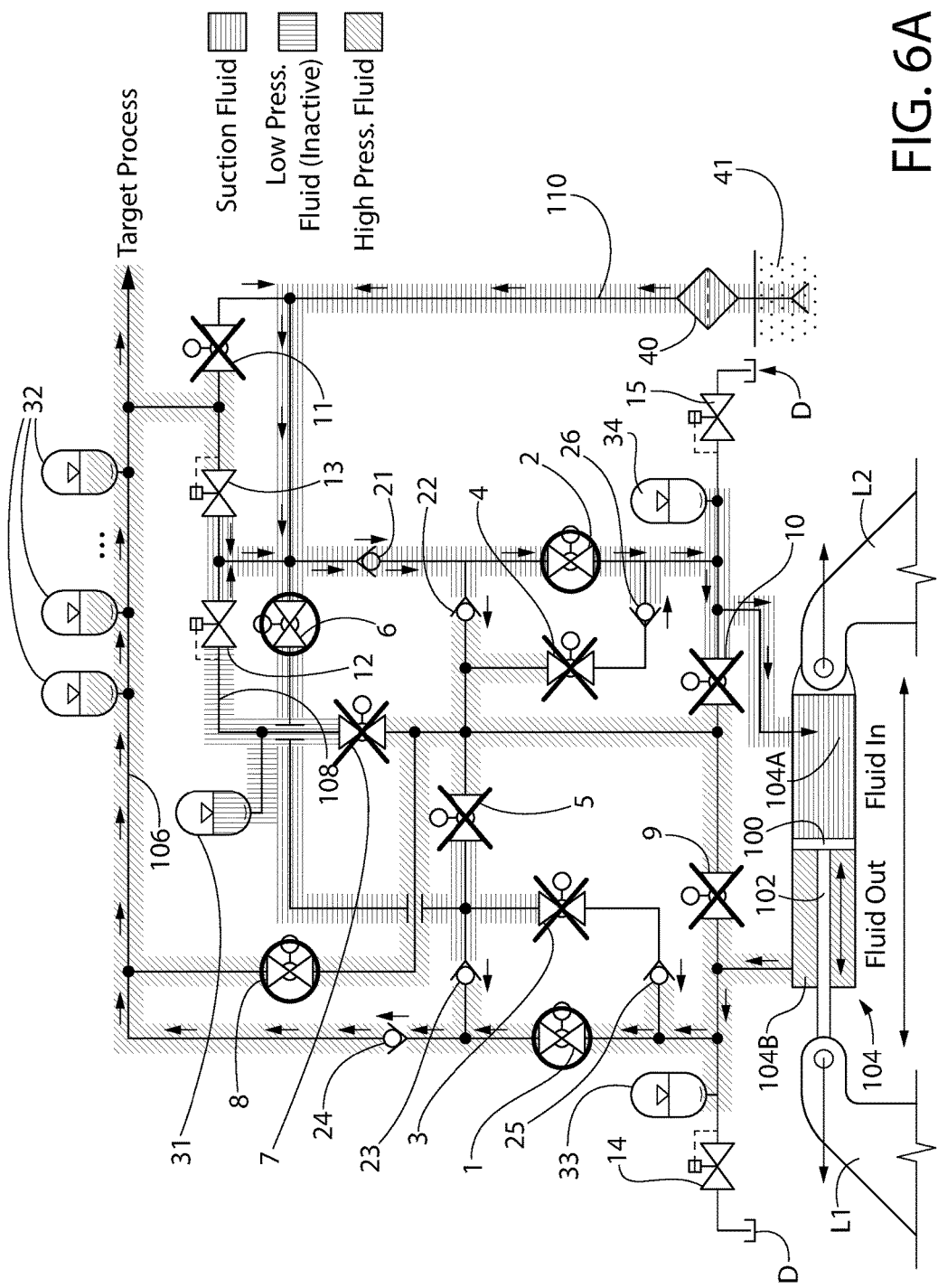
FIG. 6A depicts the particular valve states for implementing the Double-Acting Pumping Mode (DAPM) during the piston rod extension half-cycle in one of the pumps.
Figure 6B:
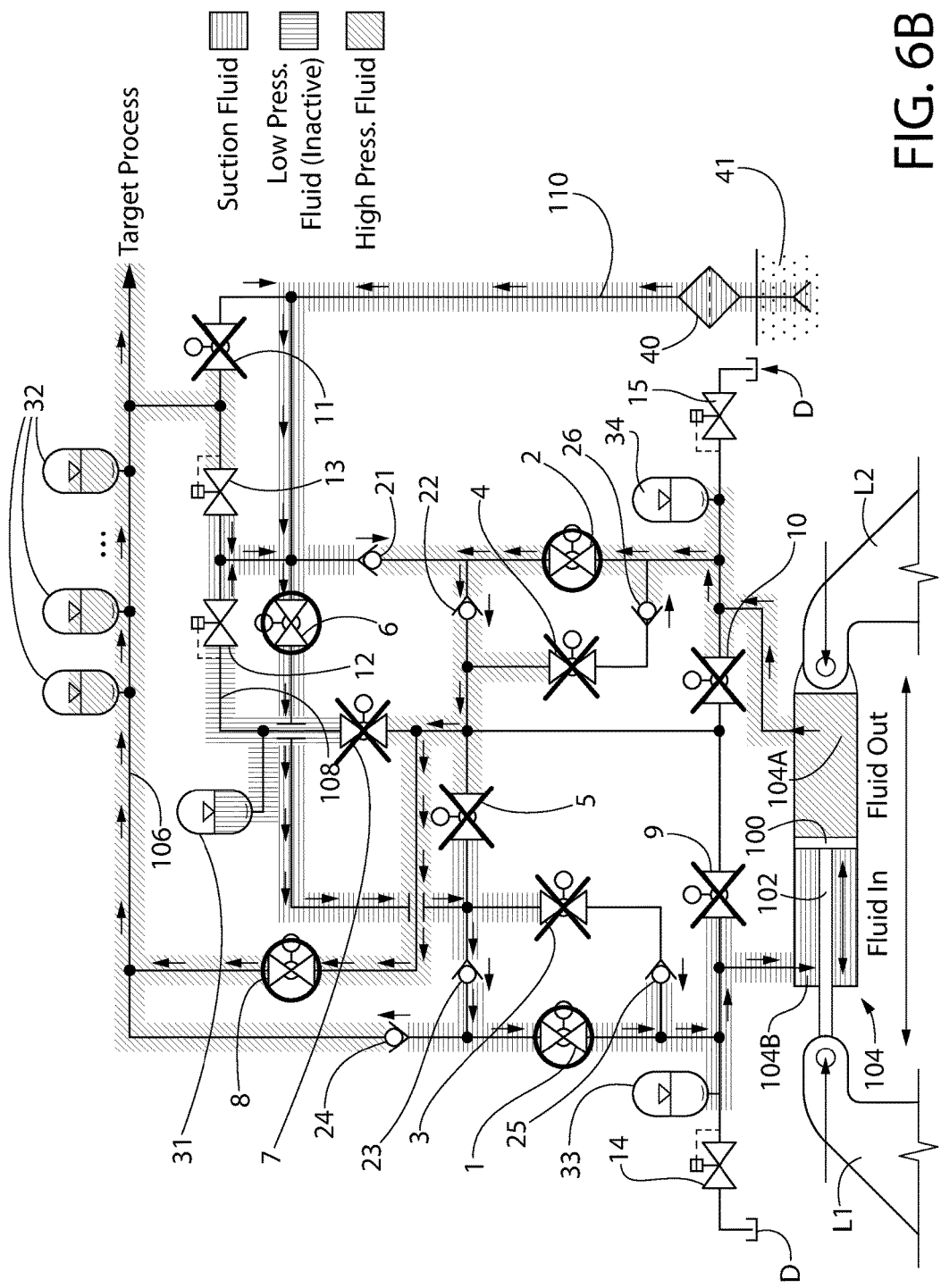
FIG. 6B depicts the particular valve states for implementing the DAPM during the piston rod retraction half-cycle in the pump of FIG. 6A.

Double-Acting Pumping Mode (DAPM): FIGS. 6A-6B

An alternate second embodiment of the instant invention of a reconfigurable fluid control and distribution system is, for example, to reconfigure the system to provide double-acting pump delivery of high pressure sea water for delivery direct flow to a reverse osmosis system for conversion to potable water. In this configuration ball valves 1, 2, 6, 8 are placed in the OPEN position, while ball valves 3, 4, 5, 7, 9, 10, 11 are placed in the SHUT position, as are relief valves 12, 13 except for overpressure conditions where they relieve their respective manifold fluids back to the suction manifold 110 until the overpressure condition is corrected.

During the portion of the cycle where the external mechanical forces cause the two hinged levers to move apart and the piston rod 102 is extended (FIG. 6A), fluid that had been within the annular cavity at the rod end of the cylinder 104B is expelled from that end of the cylinder at sufficient pressure to force the fluid through OPEN ball valve 1 and through check valve 24 into the high pressure manifold 106. Check valves 22, 23, 25 and SHUT valves 4, 5, 7, 9, 10, 11 restrict the pumped high pressure fluid to this path. During this same portion of the cycle, filtered and strained fluid is drawn into the cavity at the non-rod end of the cylinder 104B from the suction manifold 110 through check valve 21 and OPEN ball valve 2. Check valves 22, 23, and SHUT valves 4, 5, 7, 9, 10, 11 restrict the suction fluid to this path. The spring accumulators 33/34 also remain empty during this half-cycle also.

During the portion of the cycle where the external mechanical forces cause the two hinged levers to move toward each other and the piston rod to be pushed into the cylinder 104 (FIG. 6B), fluid that was in the cavity at the non-rod end of the cylinder 104 is expelled from that end of the cylinder at sufficient pressure to flow into the high pressure manifold through OPEN ball valves 2, 8 and check valve 22. Check valves 21, 24, 26 and SHUT valves 4, 5, 7, 9, 10, 11 restrict the fluid transfer from non-rod end 104A to rod end 104B of the cylinder to this path. Relief valves 12, 13 remain SHUT except for overpressure conditions where they relieve their respective manifold fluid back to the suction manifold 110 until the overpressure condition is corrected. The spring accumulators 33/34 also remain empty during this half-cycle also.

In this double-acting high pressure pumping configuration, more than twice the volume of high pressure fluid is supplied per external force cycle than with the single-acting pump. The disadvantage is that high compressive stresses are placed on the piston rod 102 during the non-rod end pumping phase. This can add to the likelihood of rod bending and increased rod seal wear unless the rod is of a robust diameter. In addition, the low pressure manifold 108 is effectively isolated and there is no differential volume induced automatic back flush of the suction screen 40. This back flush must be accomplished by momentary opening of the normally shut back flush valve 11. In addition, since both sides 104A/104B of the cylinder take direct sea suction, the advantages of a having a preliminary prime pump are lost.

Figure 7A:
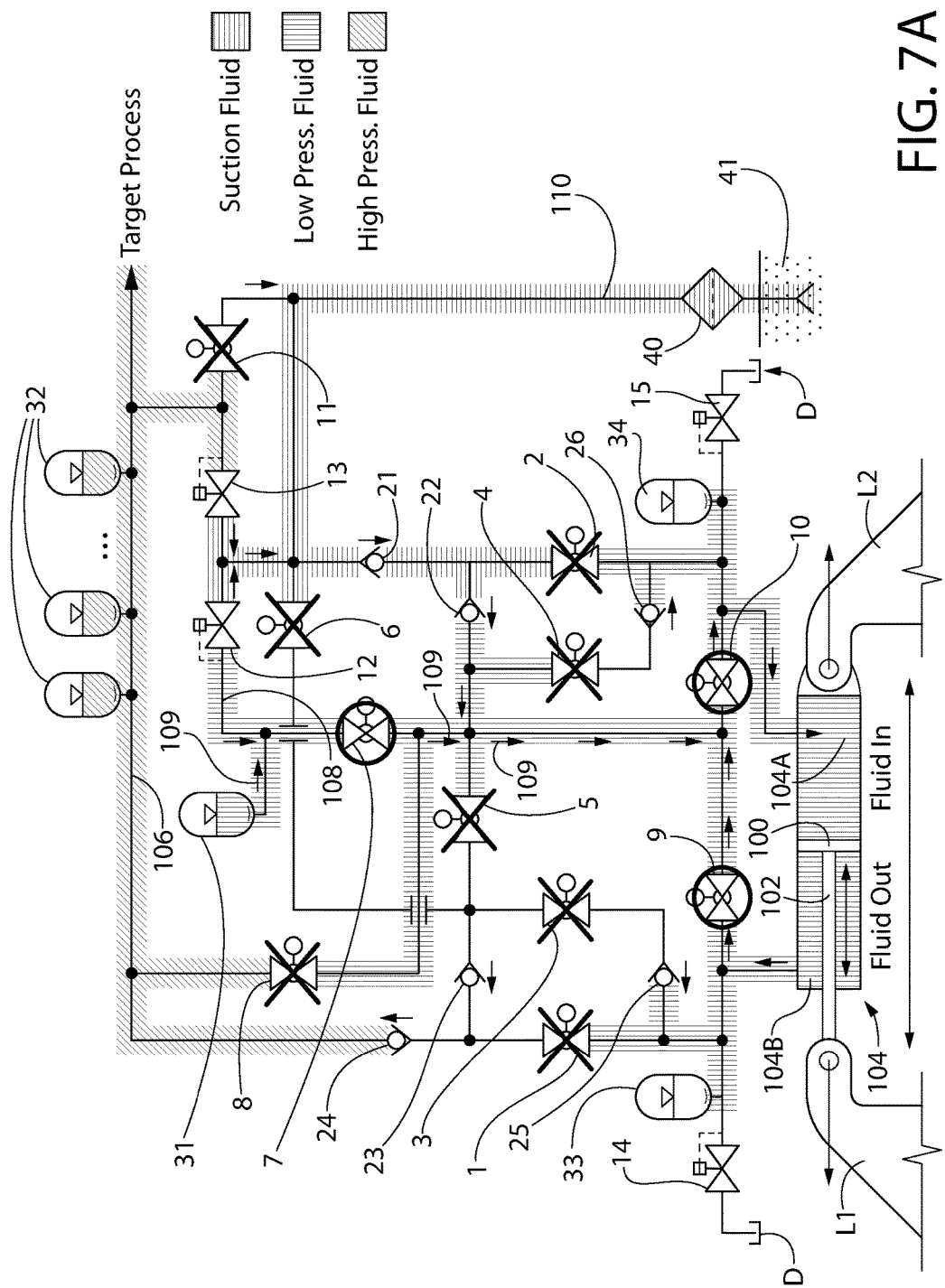
FIG. 7A depicts the particular valve states for implementing the Inactive Free Motion Mode (IFMM) during the piston rod extension half-cycle in one of the pumps.
Figure 7B:
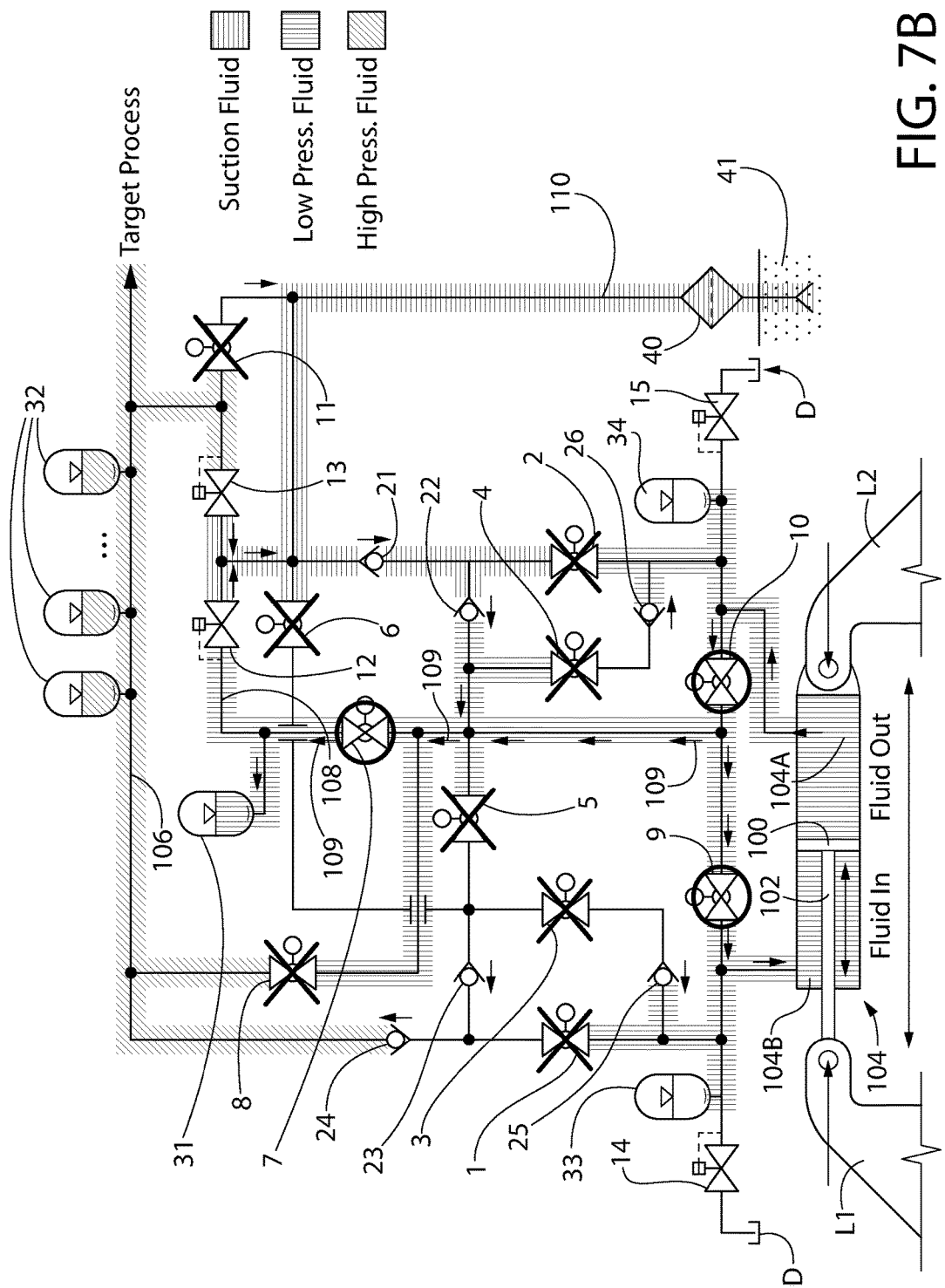
FIG. 7B depicts the particular valve states for implementing the IFMM during the piston rod retraction half-cycle in the pump of FIG. 7A.

Inactive Free Motion Mode (IFMM): FIGS. 7A-7B

An alternate third embodiment of the instant invention of a reconfigurable fluid control and distribution system is to reconfigure the system 20 to isolate the cylinder 104 from the rest of the pump group if cylinders are working together in parallel, but still permitting the piston 100 to be cycled back and forth. This feature permits increasing or decreasing the number of active cylinder pumps on line to increase or decrease the flow rate of high pressure fluid as needed without interruption of the targeted process. In this configuration (FIG. 7A) ball valves 7, 9, 10 are placed in the OPEN position, while ball valves 1, 2, 3, 4, 5, 6, 8, 11 are placed in the SHUT position, as are relief valves 12, 13 except for overpressure conditions where they relieve their respective manifold fluid back to the suction manifold until the overpressure condition is corrected.

It should be noted that the high pressure fluid in the HP manifold 106 is being provided by the other pumps 20A that are operating in either the SAPM or DAPM configurations.

During the entire external force cycle, fluid is pumped back and forth between the two internal cavities of the cylinder through open ball valves 9, 10 with a minimum of external force required. While pumping from the non-rod end cavity 104A to the rod-end cavity 104B (FIG. 7A), the excess fluid 109 due to the smaller volume of the rod end cavity 104B due to the entrained piston rod 102, the low pressure manifold 108 will supply the required extra fluid through OPEN ball valve 7. During the other half cycle (FIG. 7B), while pumping from smaller rod-end cavity 104B to the larger non-rod end cavity 104A, the excess fluid 109 will be pumped into the low pressure manifold 108 through OPEN ball valve 7.

It should be noted that during the piston rod extension half cycle (FIG. 7A), the low pressure manifold 108 provides extra fluid if maintained by other pumping cylinders, or the suction manifold 110 provides extra fluid if the LP manifold 108 is empty. Conversely, during the piston rod retraction half cycle (FIG. 7B), the fluid is pumped into the LP manifold 108 and accumulator 31 for storage and retrieval during the next half-cycle. Again, the spring accumulators 33/34 also remain empty during this half-cycle also.

Figure 8A:
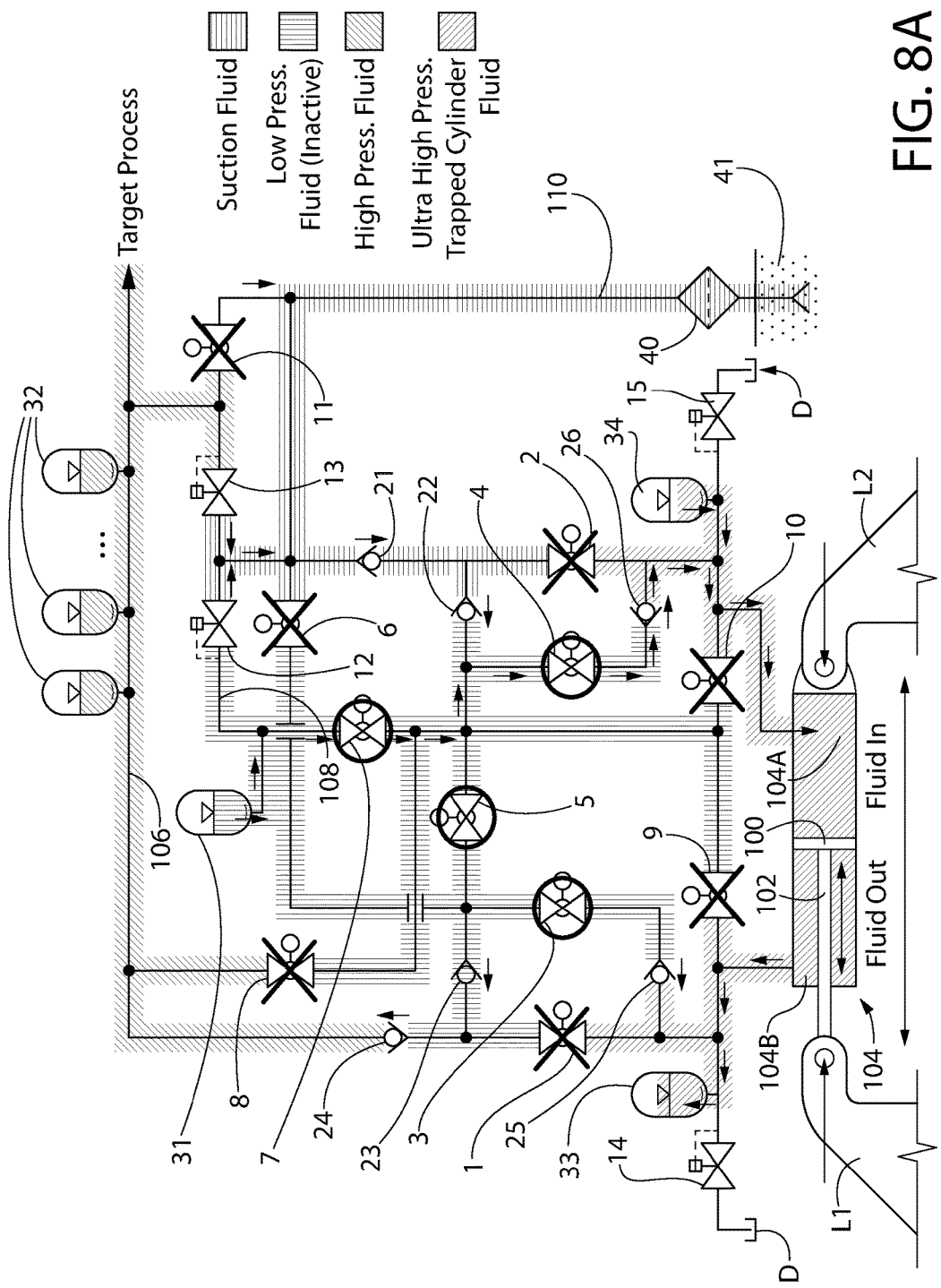
FIG. 8A depicts the particular valve states for implementing the Inactive Rigid Mode (IRM) during the piston rod extension half-cycle in one of the pumps.
Figure 8B:
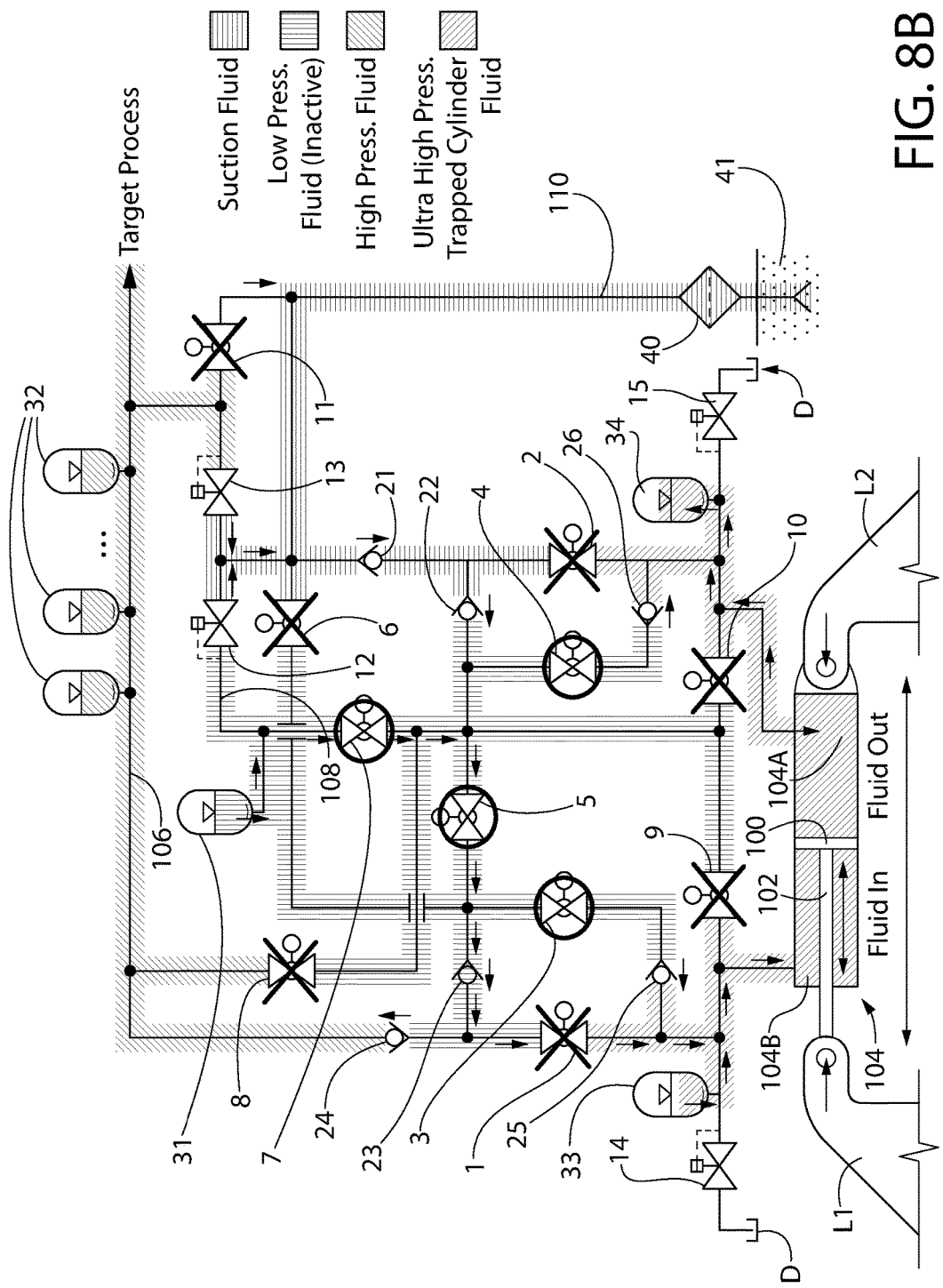
FIG. 8B depicts the particular valve states for implementing the IRM during the piston rod retraction half-cycle in the pump of FIG. 8A.

Inactive Rigid Mode (IRM): FIGS. 8A-8B

An alternate fourth embodiment of the instant invention of a reconfigurable fluid control and distribution system 20 is to reconfigure the system to isolate and rigidizing it by placing a hydraulic lock on the cylinder 104, to prevent displacement of the piston 100. This locked piston configuration could be useful when, for example, a bank of cylinders connected between two barges that are providing power to generate high pressure sea water by wave action are made rigid to make the two barges act as a single larger essentially rigid barge for ease of transport and other tasks. In this configuration, ball valves 3, 4, 5, 7 are placed in the OPEN position, while ball valves 1, 2, 6, 8, 9, 10, 11 are placed in the SHUT position, as are relief valves 12, 13 except for overpressure conditions where they relieve their respective manifold fluid back to the suction manifold 110 until the overpressure condition is corrected.

During this evolution, the isolated pistons are connected at both ends to small spring accumulators 33/34 that act as stiff fluid springs connected to the locked piston 100 to cushion and provide restoring forces against sudden external forces on the cylinder 104. Since these accumulators 33/34 are of use only when in the locked piston configuration, their internal gas bladders must be precharged to a higher pressure than normally encountered during system operation in the other the configurations. They will be in an empty fluid condition until this configuration is entered, with the internal gas charged bladder pushing against and keeping shut the internal spring-loaded fluid shutoff valve. If, after entering this configuration, large external forces on the levers L1/L2 to which the piston rod 102 and the cylinder 104 are connected are encountered causing the piston 100 to move slightly, thus raising the pressure of the trapped fluid in one of the cylinder cavities to above the attached spring accumulator 33/34 precharge pressure, a small amount of fluid from that cavity will be pumped into that spring accumulator raising its gas charge pressure as the bladder is displaced slightly by the inflow fluid. At the same time, the cylinder cavity on the other side of the piston 100 will be supplied the required fluid to make up for the piston displacement from either its attached spring accumulator 33/34 if it contains fluid, or by the low pressure manifold 108 through OPEN ball valves 3, 4, 5, 7 and check valves 25, 26 if the attached spring accumulator is emptied of its fluid. Once there is sufficient fluid in the spring accumulator connected to that cavity, it will provide any necessary make up fluid to the cavity. After each of these external force induced small piston oscillations, the spring accumulator with the higher pressure due to fluid inflow will push some of that fluid back out when the disturbing force is lessened, thus displacing the piston 100 in the opposite direction while also decreasing that spring accumulator pressure due to the fluid outflow. This outflow induced piston displacement will force some fluid from the opposite cavity into its attached spring accumulator, raising the pressure on that side. These piston displacements will continue until the fluid forces on each side of the piston are equal. It should be noted that the spring accumulator/fluid pressure on the rod-end cavity will be higher than that of the non-rod end cavity when the piston forces are equal due to the smaller annular piston area on the rod end. As each successive external force disturbance is applied to the cylinder 104, it will tend to cause the piston 100 to displace in the opposite direction proportional to the disturbing force. This will pump a corresponding amount of fluid into the spring accumulator connected to that cavity and raise its pressure, while draining a corresponding amount of makeup fluid from the opposite spring accumulator and lower its pressure. This action will produce a restoring "spring" force on the piston 100 due to the differential forces across the piston 100. This restoring force action will cushion the isolated piston 100 in a manner similar to attached mechanical springs. The volume of the spring accumulator is inversely proportional to the desired stiffness, as a smaller volume will have a greater increase in gas pressure, hence a greater resulting restoring force, for a given volume of fluid addition.

It should be noted that during startup in the IRM configuration, the spring accumulators 33/34 are initially empty. For small piston rod extension motions caused by large external forces, the LP manifold 108/accumulator 31 will provide makeup fluid to the non-rod end of the cylinder 104A; or, if the LP manifold 108 is empty, the suction manifold 108 will supply the makeup fluid. For small piston rod retraction motions caused by large external forces, the LP manifold 108/accumulator 31 will provide makeup fluid to the rod end of the cylinder 104B; or, if the LP manifold 108 is empty, the suction manifold 108 will supply the makeup fluid.

It should also be noted that for use only in this fourth mode, namely, the IRM, respective relief valves 14 and 15 are provided at the spring accumulators 33/34 for safety. These relief valves protect the system 20 from experiencing unusually high pressures in the IRM configuration should an unusually high force (e.g., large wave) try to extend or retract the locked piston. They relieve fluid from the affected accumulator side to drains D, rather than back to the suction manifold 110 or the LP manifold 108 since the relief valves 14/15 are actuated only very occasionally and only with a small discharged quantity of fluid, i.e., a small amount of fluid drained from either spring accumulator 33/34 results in a large pressure decrease back into the safe region.

As can be appreciated, implementation of the IRM configuration requires that all pumps 20A for that group of pumps 20A be placed into the IRM configuration. Thus, unlike the IFMM where one or more pumps 20A may be placed into that mode, the IRM configuration requires that all pumps 20A in the group operate in the IRM configuration.

For the purpose of this specification, although reference has been made specifically to salt water, one of ordinary skill in the art will recognize that alternative liquids will provide the same functionality, including but not limited to fresh water, hydraulic oil, or any other type of essentially incompressible fluid.

For the purpose of this specification, although reference has been made specifically to a cylindrical single-ended piston pump, one of ordinary skill in the art will recognize that this same function could be provided by other equivalent piston configurations, including but not limited to square or oval pistons and enclosing housings, double-ended pistons, or tandem connected piston pairs.

For the purpose of this specification, although reference has been made specifically to local or remotely actuated two-way ball valves, one of ordinary skill in the art will recognize that this same functionality could be provided by other equivalent two-way valves, including but not limited to spool or gate valves.

For the purpose of this specification, although reference has been made specifically to bladder hydraulic accumulators, one of ordinary skill in the art will recognize that this same functionality could be provided by other equivalent devices, including but not limited to pistons and piston accumulators.

For the purpose of this specification, although reference has been made specifically to ocean surface waves, one of ordinary skill in the art will recognize that surface waves are present in other bodies of water, including but not limited to lakes and rivers.

For the purpose of this specification, although reference has been made specifically to waves to provide the force to cause the reciprocating pumping action, one of ordinary skill in the art will recognize that this power could be provided by any sort of primary power engine, including but not limited to water wheels, tidal turbines, electric motors, or internal combustion engines.

Because numerous modifications and variations of the above described invention will occur to those of ordinary skill in the art, it is not desired to limit the invention to the exact construction and operation illustrated and described. Accordingly, all suitable modifications and equivalents may that be resorted to fall within the scope of the invention.

All such modifications and variations are intended to be included herein within the scope of this disclosure.

While the invention has been described in detail and with reference to specific examples thereof, it will be apparent to one skilled in the art that various changes and modifications can be made therein without departing from the spirit and scope thereof.

What is claimed is:

1. A method for permitting a plurality of parallel-acting bi-directional pumps to be configured into a plurality of operational modes, the plurality of parallel-acting bi-directional pumps being positioned between barges of an articulating barge wave energy converter system positioned in sea water that experiences wave motion, said method comprising:
    providing a plurality of bi-directional pumps, each bi-directional pump having a single piston and piston rod that can translate within a cylinder in two opposite directions, each piston separating said corresponding cylinder into two chambers, each piston displacing sea water located in each chamber when said piston is in motion due to external forces acting through each piston rod and each cylinder;
    coupling each chamber, through a valve network, to a high pressure manifold, a low pressure manifold and a suction manifold, said high pressure manifold having an output for delivering the high pressure sea water to a desalination system and wherein said suction manifold provides a sea water input into said bi-directional pump system; and
    controlling said valve network so that each one of said plurality of bi-directional pumps can be configured to deliver high pressure sea water from one of a single-acting pumping mode and a double-acting pumping mode, said single-acting pumping mode delivering high pressure sea water to said desalination system during piston motion in one of said two opposite directions and wherein said double-acting pumping mode delivering high pressure sea water to said desalination system during piston motion in both of said two opposite directions, said piston motion in either of said modes occurring by movement of said barges due to wave motion.

2. The method of claim 1 further comprising the step of isolating at least one bi-directional pump's cylinder from the cylinders of the remaining cylinders of said plurality of bi-directional pumps, said step of isolating said at least one bi-directional pump's cylinder comprises configuring the valve network of said at least one bi-directional pump to permit said piston of said at least one bi-directional pump to be displaced in said two opposite directions without contributing to said high pressure sea water output by said another bi-directional pump.

3. The method of claim 2 further comprising the step of rigidizing all of said plurality of bi-directional pumps for preventing the movement of the respective pistons in each of said bi-directional pumps, said step of rigidizing all of said plurality of bi-directional pumps comprises configuring said valve network to prevent the displacement of said respective pistons in said corresponding cylinders using trapped sea water.

4. The method of claim 1 wherein one of said two opposite directions is defined as an extension wherein each piston is driven in a direction that includes the piston rod and wherein maximum pressure in said high pressure manifold is maintained by having at least one accumulator, coupled to said high pressure manifold, receive a portion of said high pressure flow when said piston is extended.

5. The method of claim 4 further comprising the step of flushing of a suction filter that forms a portion of said suction manifold, said flushing step being accomplished by coupling at least one relief valve in liquid communication with said high pressure manifold, said at least one relief valve porting an excess sea water back to said suction manifold for accomplishing said flushing occurring when said maximum pressure in said high pressure manifold is exceeded.

6. The method of claim 1 wherein one of said chambers of each of said plurality of bi-directional pumps comprises an annular volume due to the presence of said piston rod therein and the other one of said chambers of each of said plurality of bi-directional pumps comprises a cylindrical volume thereby resulting in an excess sea water being generated by said cylindrical volume, and wherein said method further comprises at least one accumulator in liquid communication with said low pressure manifold, said at least one accumulator receiving said excess sea water from, and restoring said excess fluid to, said plurality of bi-directional pumps during retraction and extension of said pistons therein.

7. The method of claim 4 further comprising the step of flushing of a suction filter that forms a portion of said suction manifold, said flushing step being accomplished by coupling at least one relief valve in fluid communication with said low pressure manifold, said at least one relief valve porting an excess sea water back to said suction manifold for accomplishing said flushing occurring when said maximum pressure in said low pressure manifold is exceeded.

8. The method of claim 1 wherein said desalination system comprises a plurality of reverse osmosis tubes.

9. A pump system having a plurality of parallel-acting bi-directional pumps that can be configured into a plurality of operational modes and wherein the plurality of pumps are positioned between barges of an articulating barge wave energy converter system positioned in sea water that experiences wave motion, said pump system comprising:
- a bi-directional pump having a single piston and piston rod that can translate within a single cylinder in two opposite directions, said piston separating said cylinder into two chambers, said piston displacing sea water located in each chamber when said piston is in motion due to external forces acting through said piston rod and said cylinder;
- each chamber being in liquid communication through a valve network to a high pressure manifold, a low pressure manifold and a suction manifold, said high pressure manifold having an output for delivering high pressure sea water to a desalination system and wherein said suction manifold provides a sea water input into said pump system; and
- wherein said valve network can be configured to deliver high pressure sea water from one of a single-acting pumping mode and a double-acting pumping mode, said single-acting pumping mode delivering high pressure sea water to said desalination system during piston motion in one of said two opposite directions and wherein said double-acting pumping mode delivers high pressure sea water to said desalination system during piston motion in both of said two opposite directions.

10. The pump system of claim 9 wherein said desalination system comprises a plurality of reverse osmosis tubes.

11. A pump system having a plurality of parallel-acting bi-directional pumps that can be configured into a plurality of operational modes and wherein the plurality of pumps are positioned between barges of an articulating barge wave energy converter system positioned in sea water that experiences wave motion, said pump system comprising:
- a first bi-directional pump having a single piston and piston rod that can translate within a single cylinder in two opposite directions, said piston separating said cylinder into two chambers, said piston displacing sea water located in each chamber when said piston is in motion due to external forces acting through said piston rod and said cylinder;
- each chamber being in liquid communication through a first valve network to a high pressure manifold, a low pressure manifold and a suction manifold, said high pressure manifold having an output for delivering the high pressure sea water to a desalination system and wherein said suction manifold provides a sea water input into said pump system;
- wherein said valve network can be configured to deliver high pressure sea water from one of a single-acting pumping mode and a double-acting pumping mode, said single-acting pumping mode delivering high pressure sea water to said desalination during piston motion in one of said two opposite directions and wherein said double-acting pumping mode delivers high pressure sea water to said desalination system during piston motion in both of said two opposite directions; and
- a second bi-directional pump having a respective single piston, piston rod, single cylinder having two chambers and a valve network through which said two chambers of said second bi-directional pump are in liquid communication with said high pressure manifold, said low pressure manifold and said suction manifold and wherein said valve network of said second bi-directional pump comprises a valve network isolation configuration that isolates said second bi-directional pump's cylinder from the cylinder of said first bi-directional pump, said valve network isolation configuration permitting said piston of said second bi-directional pump to be displaced in said two opposite directions without contributing to said high pressure sea water output.

12. The pump system of claim 11 wherein said desalination system comprises a plurality of reverse osmosis tubes.

13. A pump system having a plurality of parallel-acting bi-directional pumps that can be configured into a plurality of operational modes and wherein the plurality of pumps are positioned between barges of an articulating barge wave energy converter system positioned in sea water that experiences wave motion, said pump system comprising:
- a first bi-directional pump having a single piston and piston rod that can translate within a single cylinder in two opposite directions, said piston separating said cylinder into two chambers, said piston displacing sea water located in each chamber when said piston is in motion due to external forces acting through said piston rod and said cylinder;
- each chamber being in liquid communication through a first valve network to a high pressure manifold, a low pressure manifold and a suction manifold, said high pressure manifold having an output for delivering the high pressure sea water to a desalination system and wherein said suction manifold provides a sea water input into said pump system;
- wherein said valve network can be configured to deliver high pressure sea water from one of a single-acting pumping mode and a double-acting pumping mode, said single-acting pumping mode delivering high pressure liquid to said desalination system during piston motion in one of said two opposite directions and wherein said double-acting pumping mode delivers high pressure sea water to said desalination system during piston motion in both of said two opposite directions; and a second bi-directional pump having a respective piston, piston rod, cylinder having two chambers and a valve network through which said two chambers of said second bi-directional pump are in liquid communication with said high pressure manifold, said low pressure manifold and said suction manifold and wherein said valve networks of said first and second bi-directional pumps comprise a valve network rigidizing configuration that prevents the movement of the respective pistons in each of said bi-directional pumps.

14. The pump system of claim 13 wherein said desalination system comprises a plurality of reverse osmosis tubes.

* * * * *